United States Patent
Terakawa et al.

(10) Patent No.: US 7,731,083 B2
(45) Date of Patent: Jun. 8, 2010

(54) INFORMATION COLLECTION SYSTEM, INFORMATION COLLECTION DEVICE, TERMINAL DEVICE MANAGEMENT PROGRAM, INFORMATION COLLECTION MANAGEMENT PROGRAM, INFORMATION COLLECTION MANAGEMENT METHOD, AND TERMINAL DEVICE MANAGEMENT METHOD

(75) Inventors: Nobutoshi Terakawa, Shiojiri (JP); Naomi Yamazaki, Suwa (JP)

(73) Assignee: Seiko Epson Corporation (JP)

( * ) Notice: Subject to any disclaimer, the term of this patent is extended or adjusted under 35 U.S.C. 154(b) by 1085 days.

(21) Appl. No.: 11/269,260

(22) Filed: Nov. 8, 2005

(65) Prior Publication Data

US 2006/0106875 A1    May 18, 2006

(30) Foreign Application Priority Data

Nov. 17, 2004    (JP)    ............................... 2004-332897

(51) Int. Cl.
*G06F 17/00*    (2006.01)
(52) U.S. Cl. ...................................... 235/375; 235/385
(58) Field of Classification Search ................. 235/375, 235/385
See application file for complete search history.

(56) References Cited

U.S. PATENT DOCUMENTS

| | | | | |
|---|---|---|---|---|
| 5,762,325 A | * | 6/1998 | Blatt | ........................... 269/32 |
| 5,799,285 A | * | 8/1998 | Klingman | ..................... 705/26 |
| 6,882,979 B1 | * | 4/2005 | Reay et al. | ..................... 705/26 |
| 2003/0144899 A1 | | 7/2003 | Kokubo | |
| 2004/0019657 A1 | | 1/2004 | Akiyama | |

FOREIGN PATENT DOCUMENTS

| | | |
|---|---|---|
| EP | 1193603 | 3/2002 |
| JP | 2001-250048 | 9/2001 |
| JP | 2002-149557 | 5/2002 |
| JP | 2002-351299 | 12/2002 |
| JP | 2003-016227 | 1/2003 |
| JP | 2003-076831 | 3/2003 |
| JP | 2003-076832 | 3/2003 |
| JP | 2003-216798 | 7/2003 |
| JP | 2004-118645 | 5/2004 |
| JP | 2004-164410 | 6/2004 |
| JP | 2004-220170 | 8/2004 |
| TW | 550487 | 9/2003 |
| TW | 222563 | 10/2004 |

* cited by examiner

*Primary Examiner*—Daniel St.Cyr
(74) *Attorney, Agent, or Firm*—Harness, Dickey & Pierce, P.L.C.

(57) ABSTRACT

A terminal device, in an information collection system in which the terminal device and an information collection device are connected, which reads question information from a question information storage section storing question information, as questions the responses to which are to be provided to the information collection device, and after power to the terminal device has been turned on, or based on a state of usage, receives the input of response information, as responses corresponding to output question information, and transmits the input response information to the information collection device.

14 Claims, 8 Drawing Sheets

QUESTIONNAIRE REQUEST                                          ☒

<REQUEST TO OUR CUSTOMERS>
 THANK YOU VERY MUCH FOR PURCHASING OUR COMPANY'S PRODUCT.
 IN ORDER TO ENABLE OUR COMPANY TO CREATE EVEN BETTER PRODUCTS IN FUTURE, WE WOULD LIKE TO ASK YOU, THE CUSTOMER NOW USING THIS DEVICE, TO COOPERATE IN A QUESTIONNAIRE SURVEY.
 THE NEXT TIME POWER IS TURNED ON AFTER APPROXIMATELY ONE WEEK HAS ELAPSED FROM THIS TIME, A "QUESTIONNAIRE REQUEST" SCREEN WILL BE DISPLAYED AUTOMATICALLY.
 EVERY MONTH, TEN CUSTOMERS AMONG THOSE RESPONDING TO THE QUESTIONNAIRE WILL BE RANDOMLY SELECTED TO RECEIVE A GIFT CARD WORTH 2000 YEN.
 TO COOPERATE WITH THE QUESTIONNAIRE, PLEASE CLICK THE "AGREE" BUTTON.

[AGREE]   [DO NOT AGREE]
   b            a

FIG.9

QUESTIONNAIRE REQUEST                                          ☒

SURVEY OF DEGREE OF CUSTOMER SATISFACTION WITH PRODUCTS.

THANK YOU VERY MUCH FOR PURCHASING OUR COMPANY'S PRODUCT.
 IN ORDER TO ENABLE OUR COMPANY TO CREATE EVEN BETTER PRODUCTS IN FUTURE, WE WOULD LIKE TO ASK YOU, THE CUSTOMER NOW USING THIS DEVICE, TO COOPERATE IN A QUESTIONNAIRE SURVEY.
 EVERY MONTH, TEN CUSTOMERS AMONG THOSE RESPONDING TO THE QUESTIONNAIRE WILL BE RANDOMLY SELECTED TO RECEIVE A GIFT CARD WORTH 2000 YEN.

UPON CLICKING THE "PROCEED TO QUESTIONNAIRE SCREEN" BUTTON, CONNECTION TO THE INTERNET WILL BEGIN.
 AFTER CONNECTING TO THE INTERNET, THE REGISTERED "PRODUCTION NUMBER" AND "MODEL NAME" WILL BE AUTOMATICALLY TRANSFERRED TO OUR COMPANY'S SERVER. THANK YOU FOR YOUR COOPERATION.

[PROCEED TO QUESTIONNAIRE SCREEN]   [RESPOND ONE WEEK LATER]   [CANNOT RESPOND]
             c                                 b                      a

FIG.10

ABC COMPANY PRODUCT QUESTIONNAIRE
───────────── PRODUCT EDC8800 ─────────────

OUR COMPANY WOULD APPRECIATE YOUR COOPERATION IN A QUESTIONNAIRE,
TO ENABLE US TO CREATE BETTER PRODUCTS IN FUTURE.
WOULD YOU PLEASE TAKE THE TIME TO RESPOND TO EACH OF THE FOLLOWING
QUESTIONS.
YOUR PERSONAL INFORMATION IS....

+++ QUESTIONS +++

Q1: WHERE DID YOU OBTAIN INFORMATION ON WHICH YOU BASED YOUR PURCHASE?
　○MAGAZINE AD　○NEWSPAPER AD　○MAGAZINE ARTICLE ······
　······　○TV COMMERCIAL　○DON'T KNOW　○OTHER [______]

Q2: WITH WHICH OTHER MANUFACTURERS DID YOU MAKE COMPARISONS?
　○COMPANY DEF　○COMPANY GHI ······
　······　○OTHER [______]

Q3: APPROXIMATELY WHAT WAS YOUR BUDGED DURING THE PURCHASING STAGE?
　○LESS THAN 100,000 YEN　○100,000 TO 150,000 YEN ······
　······　○DON'T KNOW

Q4: FOR WHAT PURPOSE ARE YOU USING THE PRODUCT THAT WAS PURCHASED?
　○WEB PAGE ESTABLISHMENT/CREATION　○TO ENJOY THE INTERNET AND MAIL ···
　○OTHER [______]

F1: IS THE USER AN INDIVIDUAL OR A CORPORATION?
　○INDIVIDUAL　○CORPORATION

F2: WERE YOU THE PURCHASER? ARE YOU A USER?
　○PURCHASER (I PLACED THE ORDER, BUT HARDLY EVER USE THE PRODUCT)
　○USER (SOMEONE ELSE PLACED THE ORDER, BUT I AM USING THE PRODUCT)
　○PURCHASER AND USER (I PLACED THE ORDER, AND AM ACTUALLY USING
　　THE PRODUCT) ······ a─[TRANSMIT]　[RESET]

WHEN YOU ARE SATISFIED WITH YOUR RESPONSES, PLEASE CLICK THE "TRANSMIT"
BUTTON. TO REDO ALL RESPONSES, PLEASE CLICK THE "RESET" BUTTON.

INFORMATION COLLECTION SYSTEM, INFORMATION COLLECTION DEVICE, TERMINAL DEVICE MANAGEMENT PROGRAM, INFORMATION COLLECTION MANAGEMENT PROGRAM, INFORMATION COLLECTION MANAGEMENT METHOD, AND TERMINAL DEVICE MANAGEMENT METHOD

BACKGROUND OF THE INVENTION

1. Field of the Invention

The present invention relates to an information collection system, information collection device, terminal device management program, information collection management program, information collection management method, and terminal device management method, for transmission from a terminal device to an information collection device of answer information responding to question information, and for collection of information.

Priority is claimed on Japanese Patent Application No. 2004-332897, filed Nov. 17, 2004, the content of which is incorporated herein by reference.

2. Description of Related Art

When conventional personal computers (hereafter "PCs"), printers, and other equipment are sold as products, product marketing is performed, or data for reference in developing new products is obtained, by ascertaining the type of user making a purchase, the purposes for which the purchase was made, and similar.

In such cases, for example, a postcard is inserted in advance into the packaging box of the packed product in order to have the user register and fill out a questionnaire, to obtain information relating to the user who has purchased the product. By having users who have purchased the product return such a postcard, information relating to users is collected.

In the case of the above-described technology, there is the problem that if the user loses the postcard inside the packaging box, information relating to the user cannot be collected. Moreover, there is the problem that, in order to collect information relating to the user, the user must voluntarily send the postcard. With respect to the distribution source, when the product has been sold via a sales agent, it is possible to ascertain which products have been sold in what quantity by the agent, but there is a problem in that it is not possible to ascertain the sales route beyond the agent, that is, to what users the products have been sold. There is a further problem in that, in the cases in which a father buys a product for his child to use, or in the cases in which a product is purchased by a corporation for use by an employee of the corporation, and in other cases in which a representative purchases the product but a family member other than the representative uses the product, even if information regarding the purchaser is obtained, it is not possible to collect information relating to the actual user of the product.

In addition to the above-described method using a postcard, systems have been proposed to collect information relating to users by utilizing the Internet (see for example Japanese Unexamined Patent Application, First Publication No. 2001-250048).

In the related art, when a user has the will to apply for a prize, the network information collection processing system enables collection of information related to a user upon application for the prize; but there is the problem that information relating to users who do not apply for the prize cannot be collected. That is, there is the problem that if a user does not voluntarily apply for a prize, then the entity offering the prize cannot obtain information relating to the user.

Thus in the above-described technology and the related art, there are the problems that the user must voluntarily initiate contact, and that users actually using the product cannot be ascertained.

SUMMARY OF THE INVENTION

An object of the present invention is to provide an information collection system, information collection device, terminal device management program, information collection management program, information collection management method, and terminal device management method, capable of collecting information related to users, even without voluntary actions by users.

A further object of the present invention is to provide an information collection system, information collection device, terminal device management program, information collection management program, information collection management method, and terminal device management method, capable of collecting information relating to users actually using products.

The information collection system of the present invention includes a terminal device and an information collection device which are connected, the terminal device includes a reception unit, which receives question information from a question information storage section which stores question information serving as questions, responses to which are given to the information collection device; an output unit, which, after power to the terminal device is turned on, or based on the state of use, outputs question information received by the reception unit; an input unit, which inputs response information as responses to question information output by the output unit; and a transmission unit, which transmits response information input from the input unit to the information collection device; and, the information collection device includes a question information storage section, which stores question information; a question information request reception unit, which receives question information transmission requests from the terminal device; a question information transmission unit, which reads question information from the question information storage section according to a question information transmission request received from the terminal device by the question information request reception unit, and transmits the question information to the requesting terminal device; and a response information reception unit, which receives response information, as responses, from the terminal device according to question information transmitted by the question information transmission unit.

The information collection device of the present invention, in an information collection system in which the information collection device and a terminal device are connected, includes a question information storage section, which stores question information for questions to which responses are to be received from the terminal device; a question information request reception unit, which receives question information transmission requests from the terminal device; a question information transmission unit, which reads question information from the question information storage section according to a question information transmission request received from the terminal device by the question information request reception unit; and a response information reception unit, which receives response information, as responses to question information transmitted by the question information transmission unit, from the terminal device.

In the above-described information collection device of the present invention, the question information storage section may store the question information in correspondence with identification information to identify products, and the question information transmission unit reads, from the question information storage section, question information corresponding to identification information contained in question information transmission requests transmitted from the terminal device, and transmits the read-out question information to the requesting terminal device.

The terminal device management program of the present invention, used in a terminal device in an information collection system in which the terminal device and an information collection device are connected, causes a computer to execute a step of reading question information from a question information storage section which stores question information, as questions the responses to which are provided to the information collection device, and of outputting the question information after the terminal device power is turned on, or based on a state of use; a step of inputting response information as responses to the output question information; and a step of transmitting the input response information to the information collection device.

In the above-described terminal device management program of the present invention may further include a step of detecting whether login to the terminal device is permitted for a user using the terminal device, and in that response information is transmitted for each logged-in user.

In the above-described terminal device management program of the present invention may further include a step of reading identification information from an identification information storage section which stores identification information to identify the terminal device, and in that the read-out identification information is transmitted together with the question information request.

In the above-described terminal device management program of the present invention may further include a step of inputting whether question information is to be received; a step of requesting question information from the information collection device, based on an input instruction to receive question information; and a step of receiving question information transmitted from the information collection device according to the request.

The information collection management program of the present invention, which is used in an information collection device in an information collection system in which a terminal device and the information collection device are connected, causes a computer to execute a step of receiving question information transmission requests from the terminal device; a step of reading question information from a question information storage section which stores question information as questions, the responses to which are received from the terminal device, according to a question information transmission request received from the terminal device, and of transmitting the question information to the requesting terminal device; and a step of receiving response information, as responses, from the terminal device according to the transmitted question information.

Computer-readable recording media of the present invention, on which is recorded an information collection management program used by an information collection device in an information collection system in which a terminal device and the information collection device are connected, and, the information collection management program causes a computer to execute a step of receiving question information transmission requests from the terminal device; a step of reading question information from a question information storage section which stores question information as questions, the responses to which are received from the terminal device, according to a question information transmission request received from the terminal device, and of transmitting the question information to the requesting terminal device; and a step of receiving, from the terminal device, response information, as responses, from the terminal device according to the transmitted question information.

The information collection management method of the present invention, used in an information collection device in an information collection system in which a terminal device and the information collection device are connected, includes receiving question information transmission requests from the terminal device; reading question information from a question information storage section which stores question information as questions, receiving the responses to which from the terminal device, according to a question information transmission request received from the terminal device, and the question information is transmitted to the requesting terminal device; and receiving response information, as responses, from the terminal device according to the transmitted question information.

The terminal device management method of the present invention, used in a terminal device in an information collection system in which the terminal device and an information collection device are connected, includes, reading question information, as questions the responses to which are to be provided to the information collection device from a question information storage section which stores question information, and after power to the terminal device is turned on, or after a prescribed amount of usage time has elapsed, the question information is output; receiving response information, as responses to the output question information, input from the input device; and transmitting the input response information to the information collection device.

By means of the present invention, question information is output after power to the terminal device has been turned on, or when a prescribed amount of usage time has elapsed, and response information input in response to the question information is transmitted to the information collection device. By this means, the user can be prompted to respond, even when the user does not voluntarily respond to the question information. As a result, the efficiency of collection of information relating to users can be increased. Moreover, cases in which information relating to users cannot be collected because postcards or similar included in product packaging have been lost, can be prevented.

DETAILED DESCRIPTION OF THE INVENTION

In the following, a pop-up questionnaire system to which an information collection system of an aspect of the present invention is applied is explained, referring to the drawings.

Figure 1:
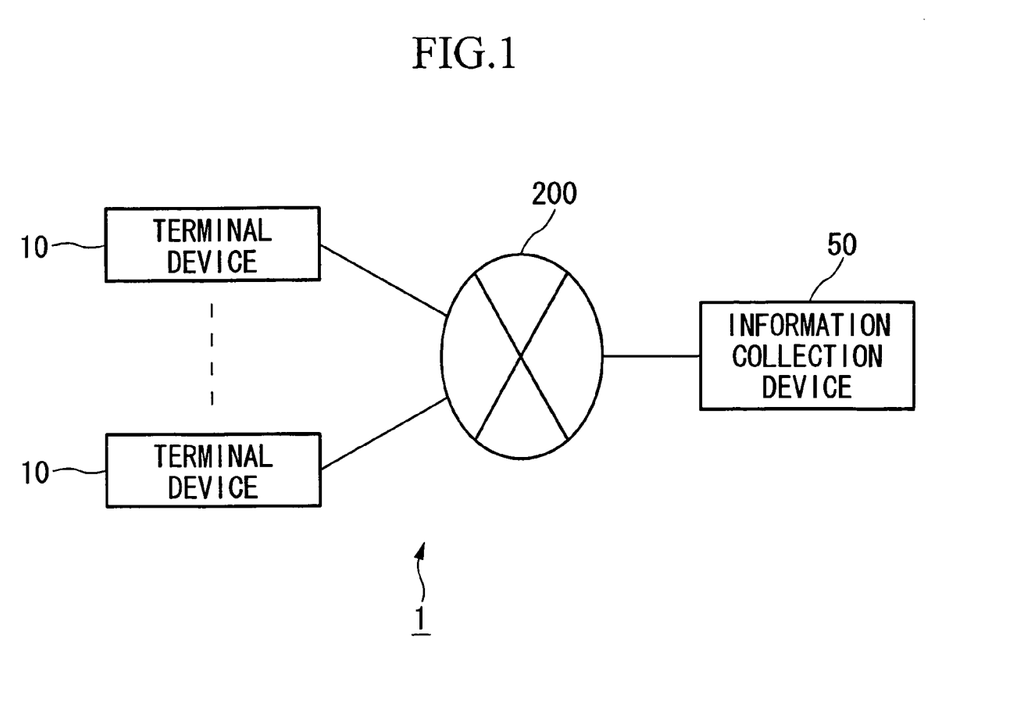
FIG. 1 is a summary block diagram showing the configuration of a pop-up questionnaire system of one aspect of the invention.

FIG. 1 is a summary block diagram showing the configuration of a pop-up questionnaire system of an aspect of the invention. In the diagram, the pop-up questionnaire system 1 is connected via a network 200 to the terminal device 10 and information collection device 50. A plurality of terminal devices 10 can also be connected to the information collection device 50 via the network 200. Next, the configuration of the terminal device 10 in FIG. 1 is explained, referring to the drawings.

Figure 2:
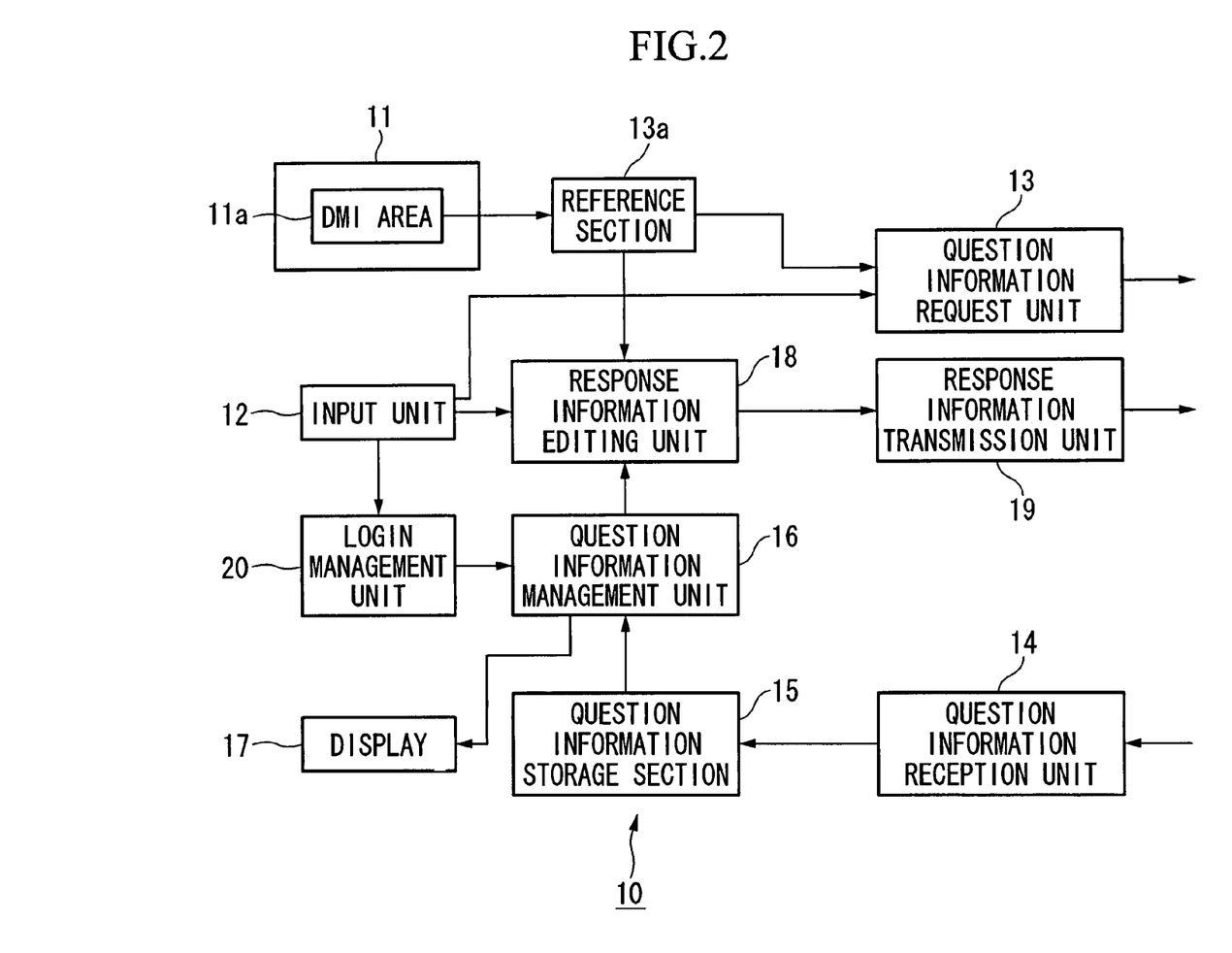
FIG. 2 is a summary block diagram showing the configuration of a terminal device.

FIG. 2 is a summary block diagram showing the configuration of the terminal device 10.

The storage section 11, which is an example of an identification information storage section, has a DMI (Desktop Management Information) area, which is a memory area for storing identification information used to identify the terminal device 10. Identification information may for example be a serial number, which is information differing for each terminal device 10, and a model number to identify the type of the terminal device 10. Here, as identification information stored in the DMI area, a combination of both a serial number and a model number is used as the identification information; but only one among either a serial number of a model number may also be used as the identification information. Also, a serial number may be read from the DMI area, and a model number may be obtained by referencing setting information in the software installed in the terminal device 10.

The input unit 12 consists of a keyboard, mouse, or other input device, and is used to input whether or not to receive question information, which are questions the responses to which are to be provided to the information collection device 50. The input unit 12 is also used to input response information, as responses to equation information output based on a user instruction. Question information is for example questionnaire information; response information is questionnaire response information, consisting of responses to questionnaire information.

The reference section 13a reads identification information from the DMI area in the storage section 11, and outputs this information to the question information request unit 13.

The question information request unit 13 transmits a request for question information to the information collection device 50, based on the instruction to receive question information input from the input unit 12. When transmitting question information, the question information request unit 13 transmits the identification information read by the reference section 13a to the information collection device 50.

The question information reception unit 14 receives the question information transmitted from the information collection device 50 according to the request by the question information request unit 13. The question information storage section 15 stores the question information received by the question information reception unit 14.

After power is turned on, or based on a state of usage, the question information management unit 16 reads question information from the question information storage section 15 and outputs the information to a display 17. The turning-on of power is detected based on the output of a detection unit which detects whether a power supply provided within the terminal device 10 is turned on or not. The state of use changes according to use of the terminal device 10; for example, the state of use may be when the usage time of the terminal device 10 has exceeded a prescribed length of time, when free storage space on a hard disk has become less than a fixed value, or when environment settings for the terminal device 10 are changed. Such an elapse of usage time is detected based on a count value output by a timer which manages the time of operation of the terminal device 10. Each time a prescribed amount of usage time of the terminal device 10 elapses, or when the total usage time of the terminal device 10 exceeds a prescribed amount of time determined in advance, question information is read from the question information storage section 15 and is output to the display 17.

The question information management unit 16 has functions for output of question information for each user for which login is permitted by the login management unit 20. The question information management unit 16 outputs to the display 17 an input screen to facilitate input of an instruction as to whether to input response information for question information. This output is accomplished, for example, by displaying a pop-up window.

The response information editing unit 18 performs editing of response information input by the input unit 12, based on question information displayed on the display 17 by the question information management unit 16, and the response information is transmitted by the response information transmission unit 19. As the editing, for example, response information may be rendered into a data format which can be received by the information collection device 50, or processing may be performed to include identification information read by the reference section 13a in the response information.

The response information transmission unit 19 transmits the response information, input by the input unit 12 and edited by the response information editing unit 18, to the information collection device 50.

The login management unit 20 authenticates the user using the terminal device 10 based on a login request, and performs management to determine whether to permit login to the terminal device 10. This user authentication can be performed by means of an ID and password or similar input from the input unit 12.

Figure 3:
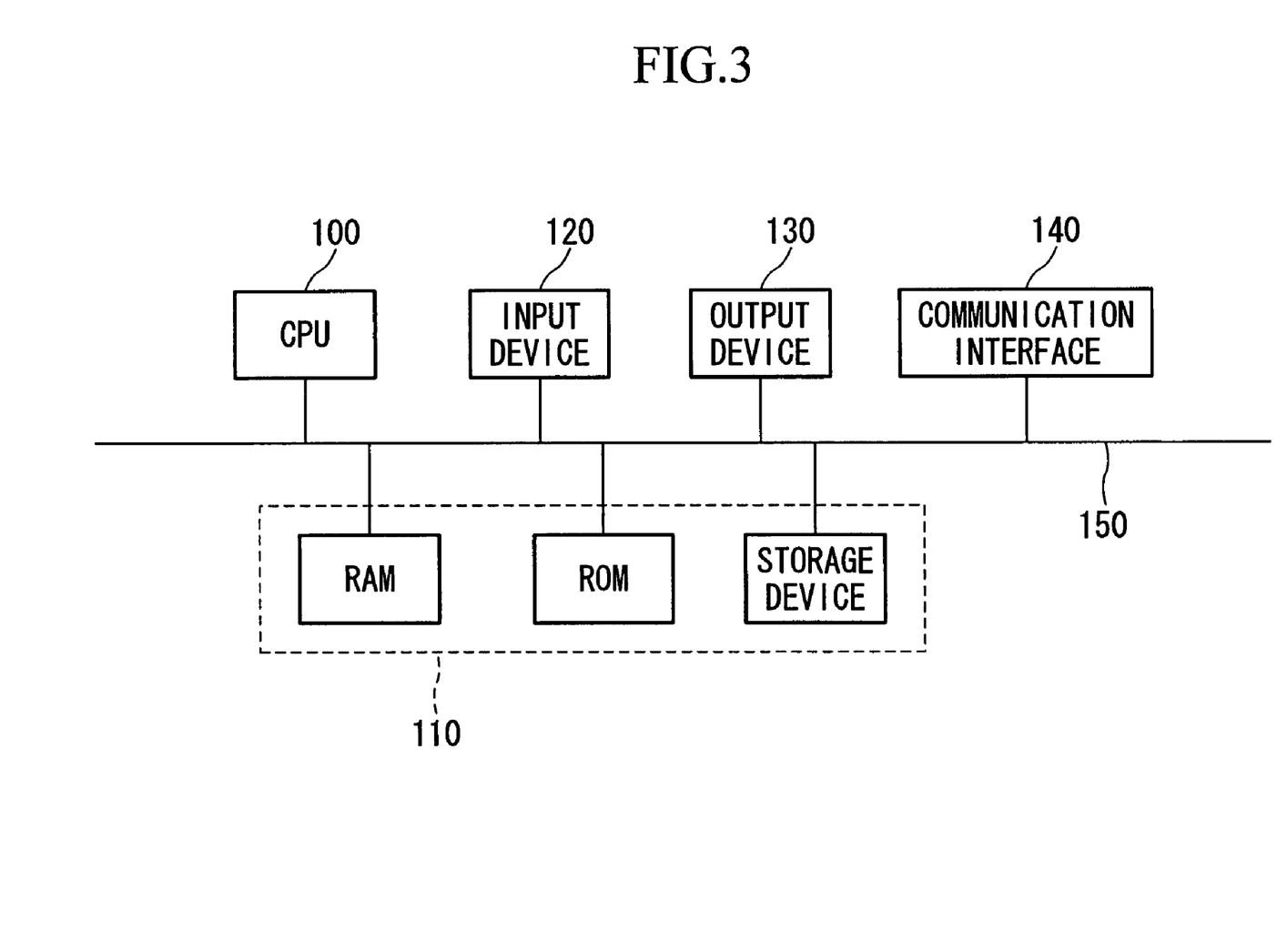
FIG. 3 is a summary block diagram showing the configuration of another aspect of a terminal device.

FIG. 3 is a summary block diagram showing the configuration of another aspect of the terminal device 10 of FIG. 2. In this diagram, the terminal device 10 consists of a CPU (Central Processing Unit) 100, RAM (Random Access Memory), ROM (Read-Only Memory), storage section 110 consisting of a hard disk device or other storage device, input device 120 such as a keyboard or mouse, output device 130 such as a liquid crystal display device, and communication interface 140 for communication with various devices over a network; these are connected by a bus 150.

Here, by storing in advance in the storage section 110 a program (for example, application software) to realize the functions of the reference section 13a, question information request unit 13, question information reception unit 14, question information management unit 16, response information editing unit 18, response information transmission unit 19, and login management unit 20 in FIG. 2, and by having the CPU 100 read and execute this program, the various functions may be realized. Moreover, this program may be recorded on computer-readable recording media, and by having a computer read and execute this program recorded on the recording media, the various functions may be realized. The input device 120 corresponds to the input unit 12 in FIG. 2; the output device 130 corresponds to the display 17 in FIG. 2; and the storage section 110 corresponds to the question information storage section 15 and storage section 11 in FIG. 2.

Here, "computer-readable recording media" refers to flexible discs, magneto-optical discs, ROM, CD-ROM or other transportable media, hard disks incorporated into computer systems, and other storage devices. Moreover, "computer-readable recording media" further consists of media which holds the program for a fixed length of time, such as volatile memory (RAM) in a server or client computer system, when the program is transmitted over the Internet or another network or over telephone circuits or other communication circuits. The above-described program may be a program which realizes a unit of the above-described functions, or may be combined with a program already recorded in a computer system to realize the above-described functions.

Next, the configuration of the information collection device 50 in FIG. 1 is explained using the drawings.

Figure 4:
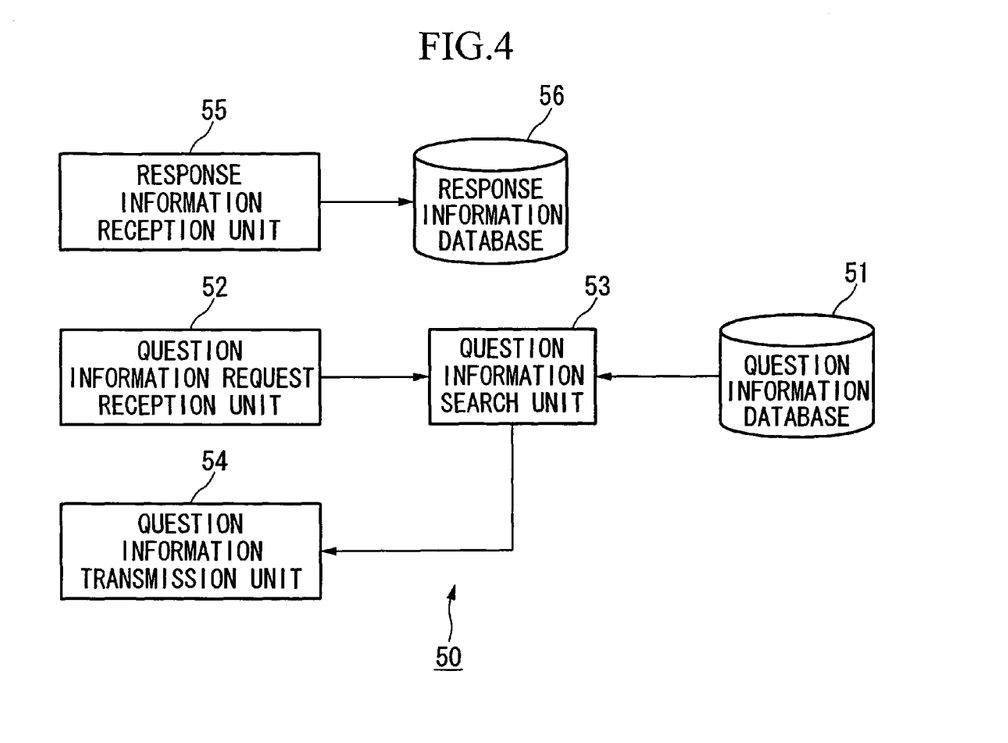
FIG. 4 is a summary block diagram showing the configuration of an information collection device.

FIG. 4 is a summary block diagram showing the configuration of an information collection device 50.

The question information storage section 51 stores question information relating to questions, response information for which is to be input at the terminal device 10, in correspondence with identification information. The question information consists of, for example, such questions as the reason for purchase of the product and the purchase budget, as well as information relating to the user, desires of the user, and similar.

The question information request reception unit 52 receives question information transmission requests from the terminal device 10.

The question information search unit 53 reads question information from the question information storage section 51, according to a question information transmission request received from the terminal device 10 by the question information request reception unit 52. Question information read from the question information storage section 51 corresponds to identification information contained in the question information transmission request.

The question information transmission unit 54 transmits question information to the requesting terminal device.

The response information reception unit 55 receives, from the terminal device 10, response information as responses to question information transmitted by the question information transmission unit 54.

The response information database 56 stores, for each user, response information received by the response information reception unit 55.

Figure 5:
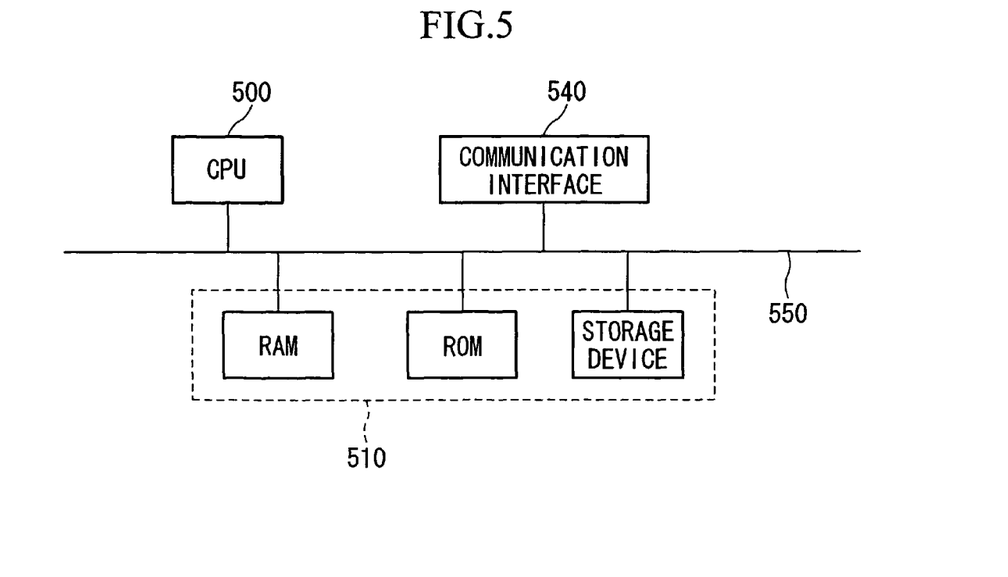
FIG. 5 is a summary block diagram showing the configuration of another aspect of an information collection device.

FIG. 5 is a summary block diagram showing the configuration of another aspect of the information collection device of FIG. 4. In the diagram, the information collection device 50 consists of a CPU (Central Processing Unit) 500, RAM (Random Access Memory), ROM (Read-Only Memory), storage section 510 consisting of a hard disk device or other storage device, and communication interface 540 for communication with various devices over a network; these are connected by a bus 550.

By storing in the storage section 510 a program to realize the functions of the question information request reception unit 52, question information search unit 53, question information transmission unit 54, and response information reception unit 55 in FIG. 4, and having the CPU 500 read and execute this program, the various functions may be realized. Further, this program may be recorded on computer-readable recording media, and by having a computer read and execute the program recorded on this recording media, the various functions may be realized. The storage section 510 corresponds to the question information storage section 51 and response information database 56 of FIG. 4.

Figure 6:
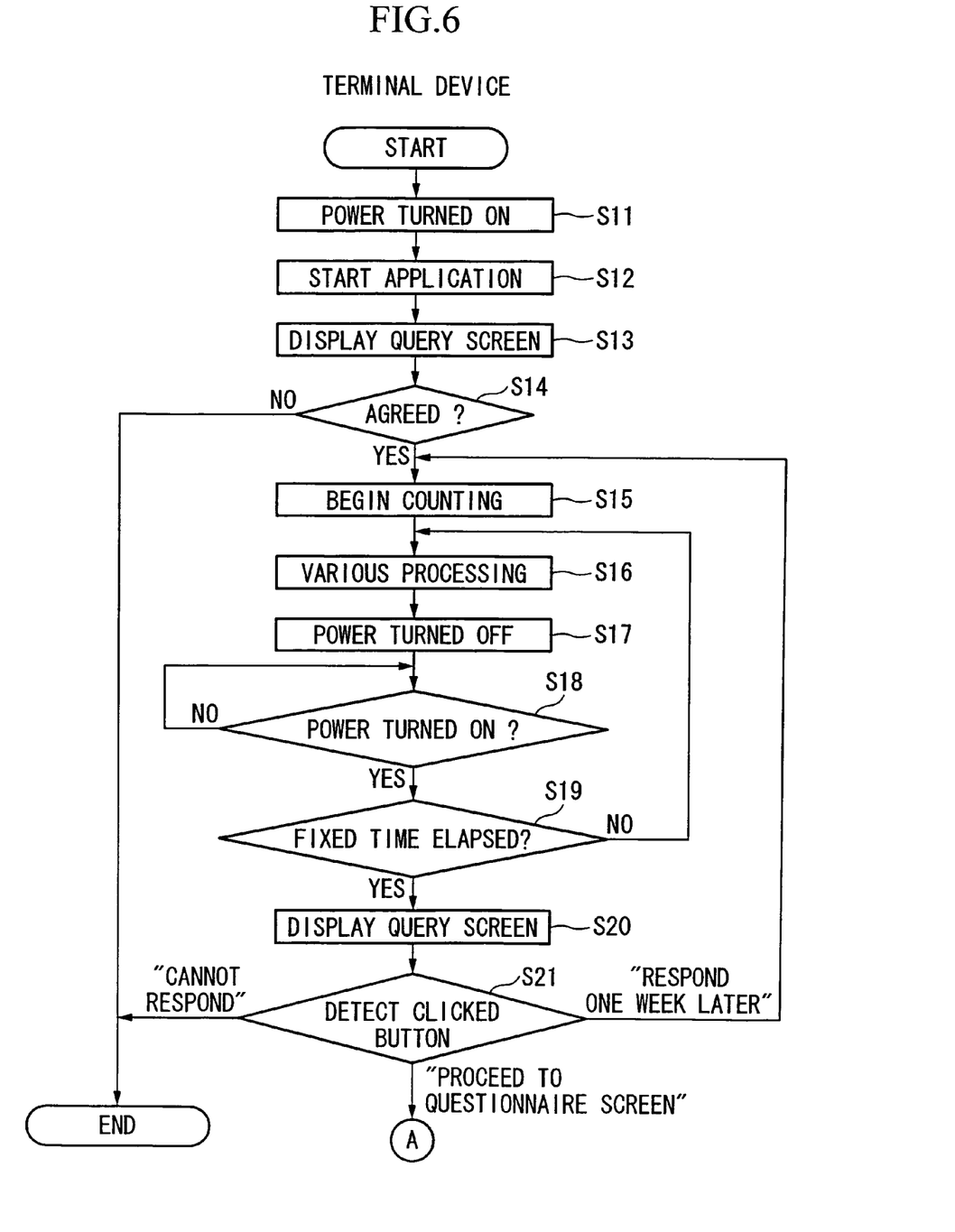
FIG. 6 is a sequence diagram used to explain the operation of a pop-up questionnaire system.
Figure 7:
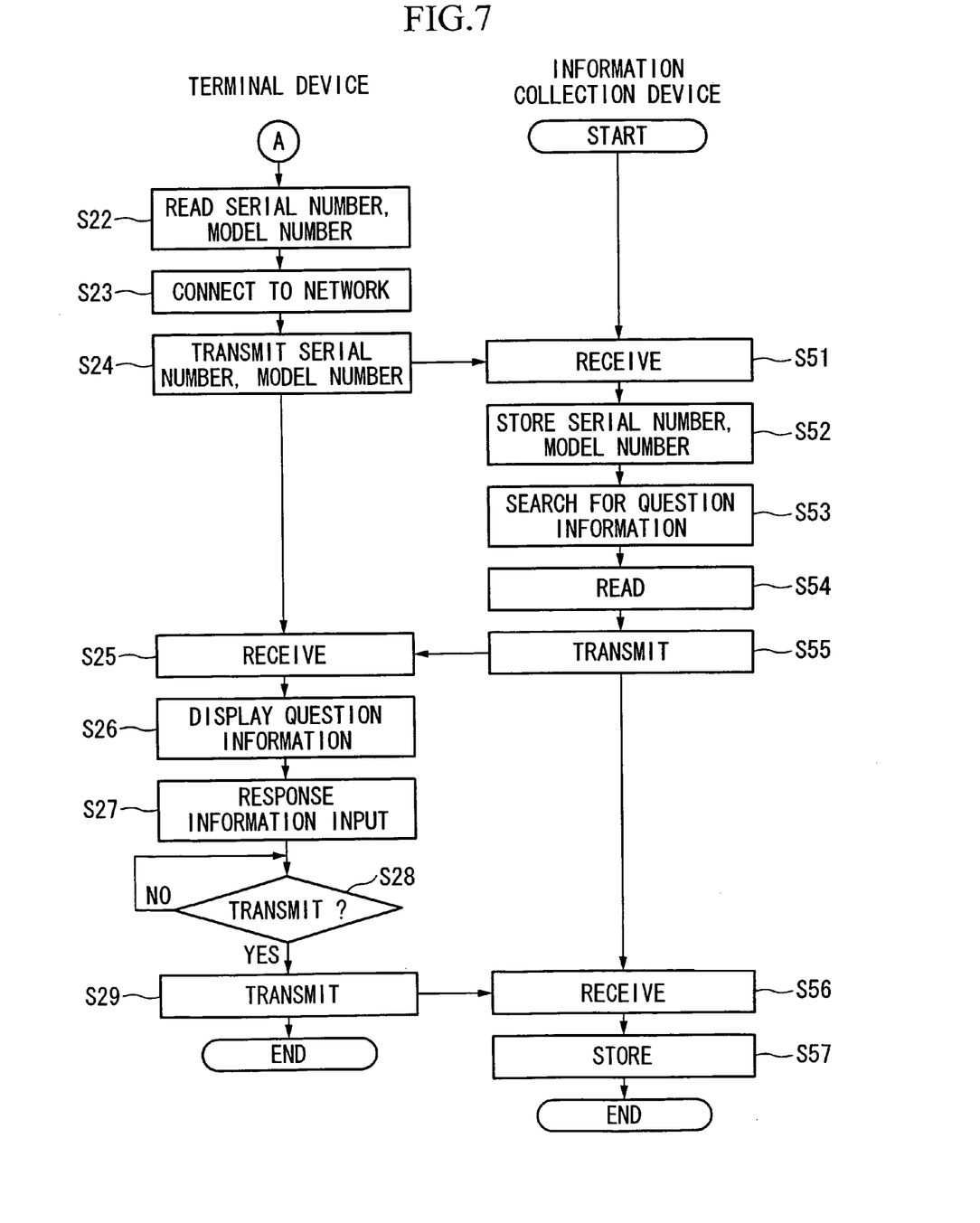
FIG. 7 is a sequence diagram used to explain the operation of a pop-up questionnaire system.

Next, operation of the pop-up window system in the above-described configuration is explained, using the block diagrams of FIG. 3 and FIG. 5 and the sequence diagrams of FIG. 6 and FIG. 7.

Figure 8:
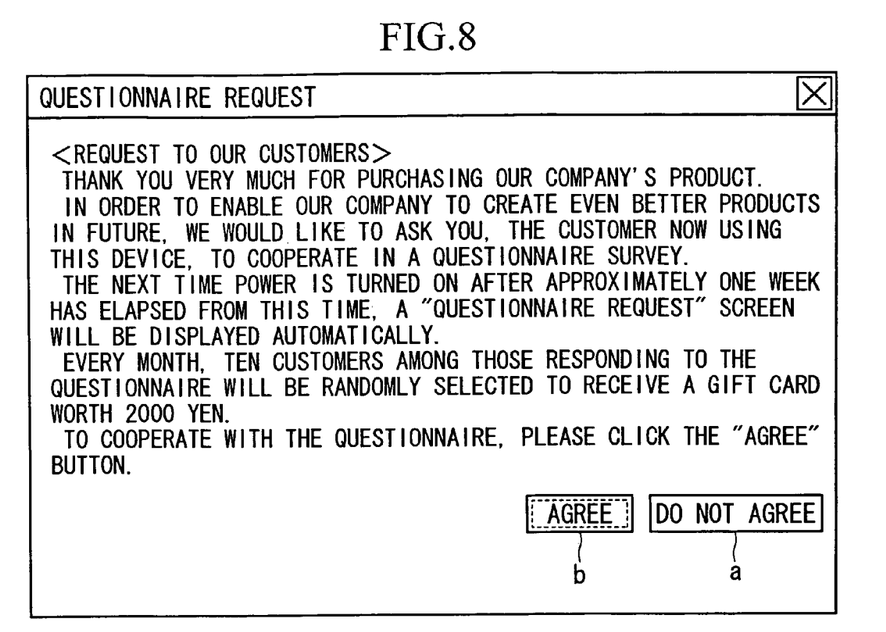
FIG. 8 is a drawing showing an example of a screen output by an output device.

First, when the power to the terminal device 10 is turned on (step S11 in FIG. 6), the CPU 100 of the terminal device 10 reads and starts an application program stored in the storage section 110 (step S12 in FIG. 6). The CPU 100 then uses a pop-up window to display, on the output device 130, a screen asking the user whether he will respond to questionnaire information (step S13 in FIG. 6). For example, a screen such as that shown in FIG. 7 is displayed. If the user, on seeing this pop-up window, clicks the "Do not agree" button (symbol a in FIG. 8) indicating that he will not respond to the questionnaire information ("NO" in step S14 of FIG. 6), the CPU 100 ends the application.

If on the other hand the "Agree" button (symbol b in FIG. 8), indicating that the user will respond to the questionnaire information, is clicked ("YES" in step S14 of FIG. 6), then the CPU 100 references the internal timer, and after beginning counting (step S15 in FIG. 6), starts the word processor software, spreadsheet software, or other software according to an instruction by the user, or performs various other processing (step S16 in FIG. 6). After ending the various other processing, the CPU 100 turns off power according to an instruction from the user to turn off the power (step S17 in FIG. 6), and subsequently detects whether the user has input an instruction to turn on the power (step S18 in FIG. 6).

When the power is turned on, the CPU 100 references the count value at which counting was begun in step S15, and detects whether a predetermined fixed time (for example, one week) has elapsed (step S19 in FIG. 6). If the fixed time has not elapsed, the CPU 100 returns to step S16.

Figure 9:
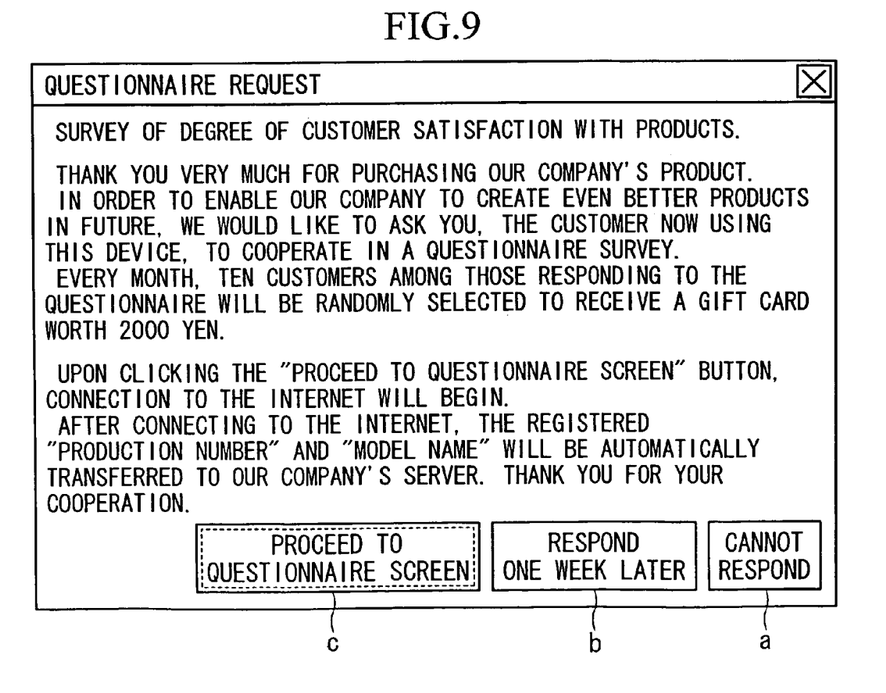
FIG. 9 is a drawing showing an example of a screen output by an output device; and, FIG. 10 is a drawing showing one example of a questionnaire screen output by an output device.

If however the fixed time has elapsed, the CPU 100 uses a pop-up window to display, on the output device 130, a "questionnaire request" screen (FIG. 9) in order to ask about the timing of responding to a questionnaire (step S20 in FIG. 5), and detects whether any of the buttons placed in the pop-up window have been clicked (step S21 in FIG. 6). If the user clicks a "cannot respond" button (symbol a in FIG. 9) indicating that the user will not respond to the questionnaire, the CPU 100 ends the application, and performs various processing.

If on the other hand a "respond one week later" button, indicating that the user will not respond immediately, but will respond after one week has elapsed, is clicked, then the CPU 100 returns to step S15.

However, if a "proceed to questionnaire screen" button, indicating that the user will respond [immediately] to the questionnaire, is clicked, then the CPU 100 reads the serial number and model number from the DMI area in the communication interface 140 (step S22 in FIG. 7), connects to the network and establishes communication with the information collection device 50 via the communication interface 140 (step S23 in FIG. 7), and transmits the read-out serial number and model number, together with a question information transmission request, to the information collection device 50 (step S24 in FIG. 7).

Upon receiving the serial number, model number, and question information transmission request from the terminal device 10 via the communication interface 540 (step S51 in FIG. 7), the information collection device 50 stores the received serial number and model number in the storage section 510 (step S52 in FIG. 7). The CPU 500 then searches the storage section 510 for question information (questionnaire information) corresponding to the received serial number (step S53 in FIG. 7), reads the question information resulting from the search (step S54 in FIG. 7), and transmits the read-out question information to the terminal device 10 via the communication interface 540 (step S55 in FIG. 7).

Figure 10:
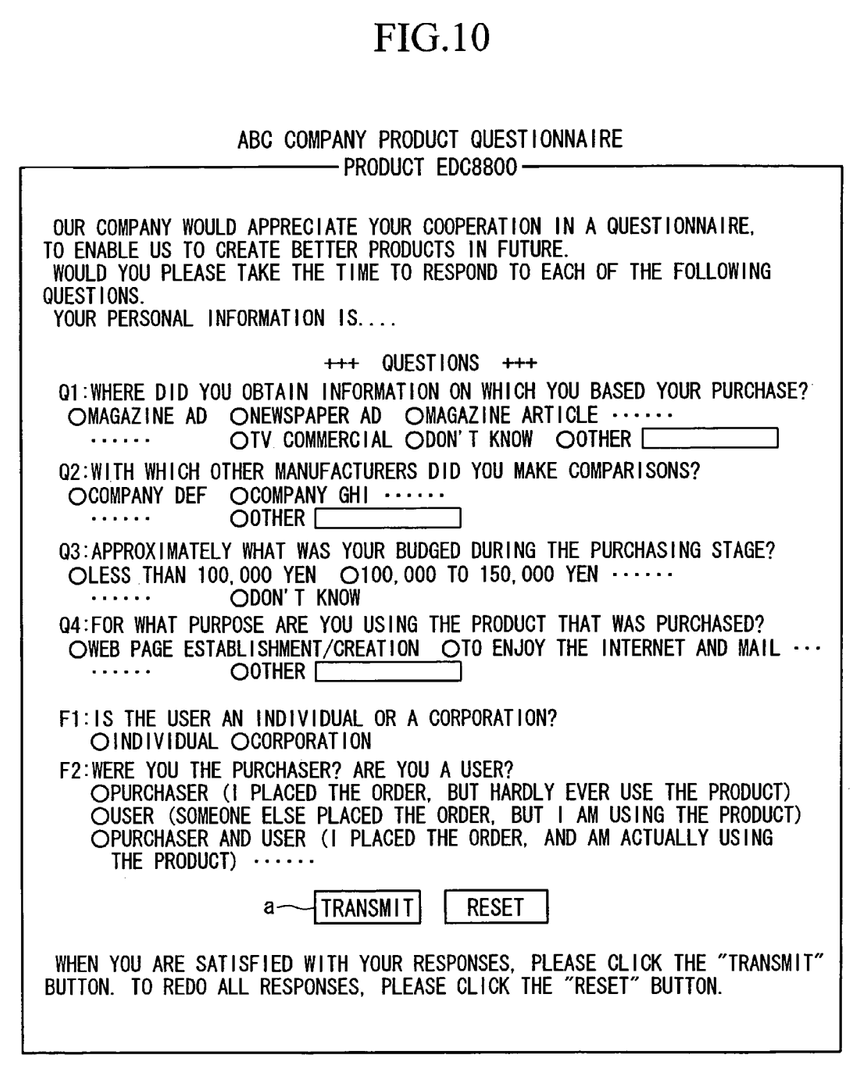

Upon receiving the question information from the information collection device 50 via the communication interface 140 (step S25 in FIG. 7), the CPU 100 of the terminal device 10 stores the question information in the storage section 110, and then outputs the information to the output device 130 (step S26 in FIG. 7). For example, questionnaire information such as that shown in FIG. 10 is displayed as question information on the screen of the output device 130 of the terminal device 10.

The user employs the input device 120 to input response information as responses to each of the questions of the questionnaire information displayed on the screen of the output device 130. The CPU 100 searches in order for response information input according to question information (step S27 in FIG. 7), and detects whether or not the "transmit" button (symbol a in FIG. 8) has been clicked (step S28 in FIG. 7). When the "transmit" button is clicked, the CPU 100 transmits the response information together with the serial number to the information collection device 50 via the communication interface 140 (step S29 in FIG. 7), switches from the questionnaire information display screen to the normal screen shown at the beginning of operation (the desktop screen), and ends the application. Thereafter, various processing is performed according to user instructions.

On the other hand, upon receiving the response information and serial number from the terminal device 10 (step S56 in FIG. 7), the CPU 500 of the information collection device 50 references the storage area of the storage section 510 which stores response information, and based on the received serial number, stores the response information in correspondence with the serial number in the storage section 510 (step S57 in FIG. 7).

According to the aspect explained above, a pop-up window is used to display, after power to the terminal device 10 is turned on, a screen asking whether or not [the user will complete] a questionnaire, so that the user can be prompted to respond to the questionnaire regardless of whether the user tends to voluntarily cooperate. As a result, the efficiency with which information relating to the user is collected can be improved. Moreover, situations in which a postcard or similar included in the product packaging is lost and information relating to the user cannot be collected can be prevented.

Moreover, the user is prompted to respond to a questionnaire during use of the terminal device 10, so that a response can be obtained from an actual user using the terminal device 10. As a result, it is possible to acquire user profile information (response information) from actual users even in cases in which products are sold via a sales agent, or when the purchaser and the actual user are different.

By acquiring profile information for actual users, it is possible to obtain the opinions of actual users regarding the types of products desired by users, and in addition, approaches to actual users can be made (promotion of replacement purchases, support information, sales promotion information).

In the above-described aspect, after the power is turned on and after the "agree" button has been clicked, and after a predetermined period (for example, one week) has elapsed and the power is again turned on, the questionnaire information is displayed and the user inputs response information; however, the question information may be received, and the user may be made to input responses to questionnaire information, immediately after the "agree" button has been clicked.

In the above-described aspect, in the application executed by the CPU 100, a user may be presented with a questionnaire each time upon logging in to the terminal device 10. In this case, when the serial number and model number from the DMI area and a question information transmission request are transmitted, the user ID used for login may also be transmitted, and response information classified and stored according to serial number and user ID. By this means, for example, when a PC is shared within a family, or in other cases in which a plurality of users share a single terminal device 10 in common, information related to users can be collected for each of the actual users. In the above-described aspect, a case was explained in which a questionnaire is presented when the power is turned on after a fixed time has elapsed since clicking the "agree" button; however, a questionnaire may again be presented after a fixed time has elapsed since completion of a questionnaire.

Further, when the fact that the remaining storage space available for storage in the terminal device 10 has fallen below a fixed amount, or when a change to the environment settings of the terminal device 10 is detected, or in similar cases, a questionnaire may be presented according to the result of detection of a change in the state of use of the terminal device 10. By this means, opinions can be collected according to a variety of circumstances of use by a user.

In the above-described aspect, when transmitting question information, the question information corresponding to a serial number was read; but question information may be stored in correspondence with model numbers in the storage section 510, and the question information corresponding to a model number may be read and transmitted to the terminal device 10. Thus by transmitting question information corresponding to a serial number or model number, a questionnaire may be presented in accordance with the characteristics of the product.

In the above-described aspect, a case was explained in which the terminal device 10 was a computer (personal computer or similar); but the terminal device is not limited to a computer, and can for example by an IT (Information Technology) home appliance equipped with computer functions.

According to the above-described aspect, a serial number and model number are read from the DMI area and transmitted to the information collection device 50, so that there is no need to have the user input the model number or serial number, and consequently input errors can be prevented.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An information collection system comprising:
   a terminal device; and
   an information collection device that is connected to the terminal device,
   wherein the terminal device comprises:
      a reception unit that receives question information from a question information storage section, the question information storage section storing the question information;

an output unit that outputs the question information received by the reception unit when the terminal device is powered on, when a prescribed amount of usage time of the terminal device has elapsed, or when free storage space on a hard disk for the terminal device has become less than a fixed value;

an input unit that inputs response information corresponding to the question information output by the output unit; and a transmission unit that transmits the response information input by the input unit to the information collection device;

and wherein the information collection device comprises:

a question information storage section that stores question information;

a question information request reception unit that receives question information transmission requests from the terminal device;

a question information transmission unit that, according to the question information transmission requests received from the terminal device by the question information request reception unit, reads the question information from the question information storage section, and that transmits the question information to the requesting terminal device; and a response information reception unit that receives response information, as responses to the question information transmitted by the question information transmission unit, from the terminal device, wherein the question information comprises a request and a questionnaire, the request asking a user to indicate whether or not the user agrees to respond to the questionnaire, and wherein the output unit outputs the questionnaire when a prescribed time has elapsed after the user indicates that the user agrees to respond to the questionnaire.

2. The information collection system according to claim 1, wherein, when the terminal device is firstly powered on after the terminal device is purchased, the output unit outputs the question information received by the reception unit.

3. The information collection system according to claim 1, wherein the request comprises asking whether the user will respond to the questionnaire after a fixed time has elapsed.

4. An information collection device included in an information collection system and connected to a terminal device, the information collection device comprising:

a question information storage section that stores question information;

a question information request reception unit that receives question information transmission requests from the terminal device when the terminal device is powered on after the terminal device is purchased;

a question information transmission unit that, according to the question information transmission requests received from the terminal device by the question information request reception unit, reads the question information from the question information storage section, and that transmits the question information to the requesting terminal device; and a response information reception unit that receives response information, as responses to the question information transmitted by the question information transmission unit, from the terminal device, wherein the question information comprises a request and a questionnaire, the request asking a user to indicate whether or not the user agrees to respond to the questionnaire, and wherein the question information transmission unit transmits the questionnaire to the terminal device when a prescribed time has elapsed after the user indicates that the user agrees to respond to the questionnaire.

5. The information collection device according to claim 4, wherein the question information storage section stores, in correspondence, the question information and identification information to identify products, and the question information transmission unit reads, from the question information storage section, the question information corresponding to identification information comprised by question information transmission requests transmitted from the terminal device, and transmits the read question information to the requesting terminal device.

6. The information collection device according to claim 4, wherein the prescribed time is one week.

7. A terminal device management program, used by a terminal device included in an information collection system and connected to an information collection device, and which causes a computer to execute the steps of:

when the terminal device is powered on, when a prescribed amount of usage time of the terminal device has elapsed, or when free storage space on a hard disk for the terminal device has become less than a fixed value, reading question information from a question information storage section and outputting the question information;

inputting response information, as responses to the output question information; and transmitting the input response information to the information collection device, wherein the question information comprises a request and a questionnaire, the request asking a user to indicate whether or not the user agrees to respond to the questionnaire, and wherein the questionnaire is output when a prescribed time has elapsed after the user indicates that the user agrees to respond to the questionnaire.

8. The terminal device management program according to claim 7, further causing the computer to execute a step of detecting whether or not a user using the terminal device is permitted to log into the terminal device, and wherein the response information is transmitted for each of the logged-in users.

9. The terminal device management program according to claim 7, further causing the computer to execute a step of reading identification information to identify the terminal device from an identification information storage section which stores the identification information, and wherein the read identification information is transmitted together with the question information request.

10. The terminal device management program according to any one of claims 7 to 9, further causing the computer to execute the steps of:

inputting whether to receive the question information;

requesting the question information from the information collection device, based on the input instruction to receive question information; and receiving the question information transmitted from the information collection device according to the request.

11. An information collection management program, used by an information collection device in an information collection system and connected to a terminal device, and which causes a computer to execute the steps of:

when the terminal device is powered on after the terminal device is purchased, receiving question information transmission requests from the terminal device;

reading question information from a question information storage section which stores question information, as questions that have responses to be received from the terminal device, according to the question information transmission requests received from the terminal device, and transmitting the question information to the requesting terminal device, the question information comprising a request and a questionnaire, the request asking a user to indicate whether or not the user agrees to respond to the questionnaire, the questionnaire being transmitted to the terminal device when a prescribed time has elapsed after the user indicates that the user agrees to respond to the questionnaire; and receiving response information, as responses according to the transmitted question information, from the terminal device.

12. A tangible computer-readable recording medium, on which is recorded an information collection management program used by an information collection device included in an information collection system and connected to a terminal device, and which causes a computer to execute the steps of:

when the terminal device is powered on after the terminal device is purchased, receiving question information transmission requests from the terminal device;

reading question information from a question information storage section which stores the question information, as questions that have responses to be received from the terminal device, according to the question information transmission requests received from the terminal device, and transmitting the question information to the requesting terminal device, the question information comprising a request and a questionnaire, the request asking a user to indicate whether or not the user agrees to respond to the questionnaire, the questionnaire being transmitted to the terminal device when a prescribed time has elapsed after the user indicates that the user agrees to respond to the questionnaire; and receiving response information, as responses according to the transmitted question information, from the terminal device.

13. An information collection management method, used by an information collection device in an information collection system in which a terminal device and an information collection device are connected, comprising:

when the terminal device is powered on after the terminal device is purchased, receiving a question information transmission request from the terminal device;

reading question information from a question information storage section which stores question information, as questions that have responses to be received from the terminal device, according to the question information transmission request received from the terminal device, and the question information is transmitted to the requesting terminal device; and reading response information, as responses to the transmitted question information from the terminal device, wherein the question information comprises a request and a questionnaire, the request asking a user to indicate whether or not the user agrees to respond to the questionnaire, the questionnaire being transmitted to the terminal device when a prescribed time has elapsed after the user indicates that the user agrees to respond to the questionnaire.

14. A terminal device management method, used by a terminal device included in an information collection system and connected to an information collection device, comprising:

when the terminal device is powered on, when a prescribed amount of usage time of the terminal device has elapsed, or when free storage space on a hard disk for the terminal device has become less than a fixed value, reading question information from a question information storage section and outputting the question information;

receiving response information, as responses to the output question information, input from the input device; and transmitting the input response information to the information collection device, wherein the question information comprises a request and a questionnaire, the request asking a user to indicate whether or not the user agrees to respond to the questionnaire, the questionnaire being transmitted to the terminal device when a prescribed time has elapsed after the user indicates that the user agrees to respond to the questionnaire.

* * * * *